United States Patent
Lim

(10) Patent No.: US 7,828,318 B2
(45) Date of Patent: Nov. 9, 2010

(54) AIRBAG SYSTEM FOR VEHICLES

(75) Inventor: Kyung Taek Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 12/264,807

(22) Filed: Nov. 4, 2008

(65) Prior Publication Data
US 2009/0224518 A1 Sep. 10, 2009

(30) Foreign Application Priority Data
Mar. 10, 2008 (KR) .................. 10-2008-0022051

(51) Int. Cl.
*B60R 21/20* (2006.01)
(52) U.S. Cl. .................. 280/728.3; 280/736; 280/743.1
(58) Field of Classification Search .............. 280/728.3, 280/736, 743.2
See application file for complete search history.

(56) References Cited

U.S. PATENT DOCUMENTS

| 5,431,433 | A | 7/1995 | Steimke et al. | |
|---|---|---|---|---|
| 7,354,064 | B2 * | 4/2008 | Block et al. | 280/743.2 |
| 7,448,648 | B2 * | 11/2008 | Thomas et al. | 280/743.2 |
| 7,510,212 | B2 * | 3/2009 | Green et al. | 280/743.2 |
| 2003/0189326 | A1 * | 10/2003 | Short et al. | 280/736 |
| 2009/0189379 | A1 * | 7/2009 | Unno et al. | 280/743.2 |

FOREIGN PATENT DOCUMENTS

KR 10-0616013 B1 8/2006

* cited by examiner

*Primary Examiner*—Faye M. Fleming
(74) *Attorney, Agent, or Firm*—Morgan, Lewis & Bockius LLP

(57) ABSTRACT

The airbag system for vehicles includes an airbag housing, a sliding door and a connection member. The airbag housing has a gas injection hole, through which inflation gas is injected into an airbag cushion when a vehicle collision occurs. The sliding door moves over the gas injection hole to control the amount of inflation gas injected into the airbag cushion. The connection member is connected between the airbag cushion and the sliding door such that the sliding door is moved by the inflation of the airbag cushion.

17 Claims, 4 Drawing Sheets

AIRBAG SYSTEM FOR VEHICLES

CROSS-REFERENCE TO RELATED APPLICATIONS

This application claims priority to Korean Application No. 10-2008-0022051, filed on Mar. 10, 2008, the disclosure of which is incorporated herein by reference.

BACKGROUND OF THE INVENTION

1. Field of the Invention

The present invention relates to an airbag system for vehicles and more particularly, an airbag system for vehicles which is constructed such that a child can be prevented from being injured by the inflation pressure of an airbag cushion which is set for adults.

2. Description of the Related Art

Generally, airbag systems, along with safety belts, are installed in vehicles to absorb impacts applied to passengers in the vehicles.

Such an airbag system serves to absorb an impact applied to a passenger when the body of the passenger leans forwards when a vehicle collision occurs or when the vehicle, which is traveling, suddenly stops, thus preventing the passenger from directly striking a steering wheel or an instrument panel.

However, in the case where a child sits in a passenger seat, in particularly, in the case where the child sits in a safety seat for children installed on the passenger seat, the body of the child is disposed closer to a crash pad than when a typical adult sits on the passenger seat. In this state, if an airbag cushion is inflated at the same inflation pressure as the airbag system, which is set to be suitable for adults, the airbag cushion may strike the child before the airbag cushion is completely inflated, thus injuring the child.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and embodiments of the present invention provide an airbag system for vehicles which is constructed such that a child can be prevented from being injured by the inflation pressure of an airbag cushion which is set for adults.

In order to accomplish the above object, the present invention provides an airbag system for vehicles, comprising a gas injection hole, an airbag housing having the gas injection hole and an inflator therein, so that inflation gas of the inflator is injected into an airbag cushion through the gas injection hole when a vehicle collision occurs, wherein the airbag cushion encloses the gas injection hole, a sliding door configured to move over the gas injection hole and to control an amount of the inflation gas injected into the airbag cushion, and a connection member coupling an inner portion of the airbag cushion and a portion of the sliding door and slidably moving the sliding door over the gas injection hole in response to inflation of the airbag cushion.

The gas injection hole may be formed in the airbag housing at a position corresponding to a direction in which the airbag cushion is inflated when the vehicle collision occurs. The sliding door further may comprise a coupling hole thereon and an end portion of the connection member is coupled to the sliding door through the coupling hole. The connection member may be disposed in the airbag cushion to maintain the airbag cushion in a predetermined shape when the airbag cushion is inflated. The connection member may be a tether.

In another exemplary embodiment of the present invention, the an airbag system for vehicles may further comprise a door guide member provided around the gas injection hole, the door guide member having a guide space and guiding the sliding door through the guide space in a direction in which the sliding door is moved to control an opening amount of the gas injection hole. The connection member may couple the inner portion of the airbag cushion and the portion of the sliding door through the guide space of the door guide member. The door guide member may be supported by a retainer. An end portion of at least a connection pins may be provided on the sliding door, the other end of the connection pin being fastened to the airbag housing.

Furthermore, the at least a connection pins may be provided on the sliding door in parallel along breadth direction of the sliding door. The connection pin may be broken when a force of a predetermined load or more is applied thereto by the inflation of the airbag cushion. The connection pin may be made of nylon 66. The connection pin may be configured to be broken when a load of an approximately 0.5 kgf is applied thereto.

The at least a connection pins may be provided on the sliding door in series along longitudinal direction of the sliding door. The connection pin may be broken when a force of a predetermined load or more is applied thereto by the inflation of the airbag cushion. The connection pin may be made of nylon 66. The connection pin may be configured to be broken when a load of an approximately 0.5 kgf is applied thereto.

The sliding door may be opened with a predetermined amount at initial state.

BRIEF DESCRIPTION OF THE DRAWINGS

The above and other objects, features and advantages of the present invention will be more clearly understood from the following detailed description taken in conjunction with the accompanying drawings, in which.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 1:
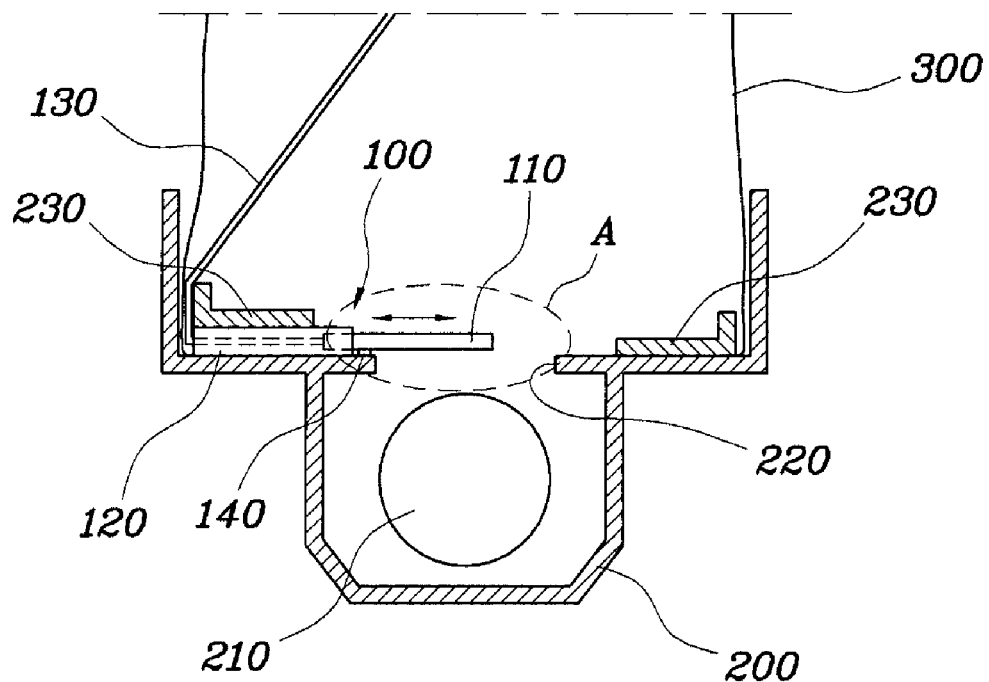
FIG. 1 is a view showing the construction of an airbag system for vehicles, according to an embodiment of the present invention.
Figure 2:
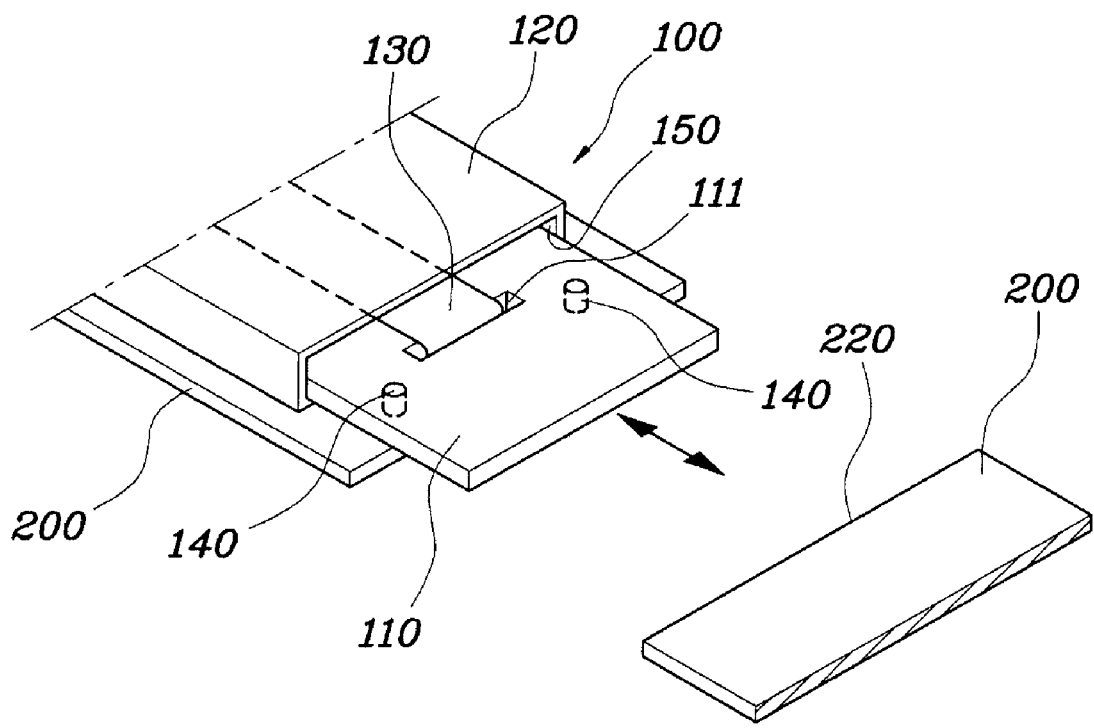
FIG. 2 is a perspective view of a circled portion "A" of FIG. 1.
Figure 3:
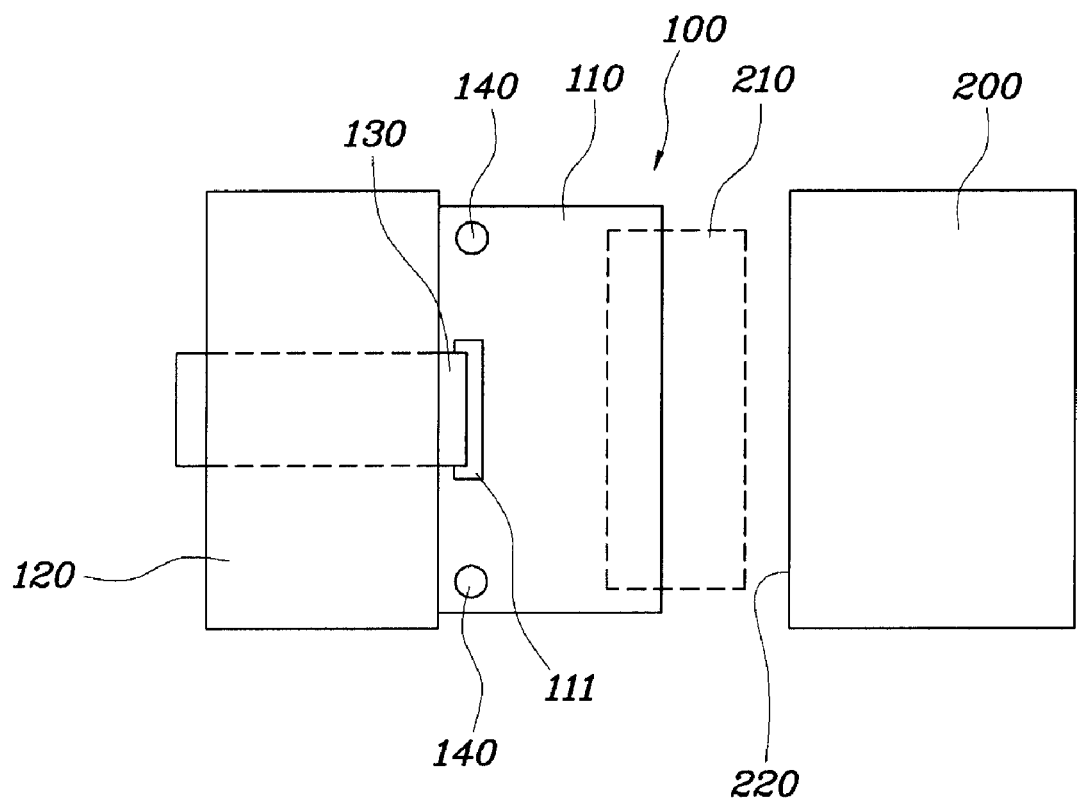
FIG. 3 is a plan view of FIG. 2.

As shown in FIGS. 1 through 3, an airbag system according to the present invention is constructed such that a sliding door 110 for adjusting the amount of inflation gas discharged from an inflator 210 is provided in an airbag housing 200, so that when a child sits on a passenger seat of a vehicle, the child can be prevented from being injured by the inflation pressure of an airbag cushion 300 at an initial stage of the inflation process of the airbag system.

The detailed construction of the airbag system that achieves the above-mentioned purpose will be described herein below. The airbag system according to the preferred embodiment of the present invention includes an airbag housing 200, which has a gas injection hole 220 therein, and an air cushion 300, which fluid-communicates with the gas injection hole 220 in the airbag housing 200. The air cushion 300 is inflated by inflation gas discharged from the gas injection hole 220 when a vehicle collision occurs. The airbag system further includes an injection hole control unit 100, which is provided in the airbag housing 200 to adjust the amount of opening of the gas injection hole 220.

The airbag housing 200 is installed inside a crash pad of a passenger seat. An inflator 210 for supplying inflation gas when a vehicle collision occurs is installed under the gas injection hole 220 in the airbag housing 200. The inflator 210 is constructed such that, when an operation signal is sent thereto, a gas forming agent is burned by electric ignition, thus generating inflation gas.

The gas injection hole 220, through which inflation gas generated by the inflator 210 is supplied into the airbag cushion 300, is formed in the airbag housing 200 at a position corresponding to the direction in which the airbag cushion 300 is inflated when a vehicle collision occurs. The gas injection hole 220 is covered with the airbag cushion 300 such that the injection hole 220 and the airbag cushion 300 fluid-communicate with each other.

The airbag cushion 300 is configured to be inflated by the injection of inflation gas to absorb an impact attributable to a collision of the vehicle and prevent a passenger from being injured.

A connection member 130 is provided in the airbag cushion 300 to hold the airbag cushion 300 and thus prevent the airbag cushion 300 from being excessively extended in one direction when the airbag cushion 300 is inflated. In this embodiment, a connection member 130, which will be explained later, is a tether. The tether serves to maintain the airbag cushion 300 in a desired shape when the air bag cushion 300 is inflated, in order to safely protect the passenger from an impact attributable to the vehicle collision. For example, when the tether completely spreads, the airbag cushion 300 is inflated so as to safely protect the passenger, particularly an adult from the impact.

The airbag cushion 300 having the above-mentioned structure is designed such that it is inflated to a volume suitable for an adult body at an initial stage of the operation of the airbag system. Therefore, in the case of a child disposed adjacent to the crash pad, he/she may be injured by the airbag cushion 300, which is momentarily inflated at an inflation pressure. To prevent this, a function of controlling the inflation pressure of the airbag cushion 300, that is, a function of reducing the inflation pressure thereof to an appropriate amount at an initial stage of the inflation of the airbag cushion 300, is required. In the present invention, the injection hole control unit 100 conducts this function.

The injection hole control unit 100 includes a sliding door 110, which controls the opening amount of the gas injection hole 220, a door guide member 120, which is provided around the gas injection hole 220 and has a guide space 150 through which the sliding door 110 is retractably disposed, and the connection member 130 which connects the airbag cushion 300 to the sliding door 110 through the guide space 150 of the door guide member 120.

The sliding door 110 has a structure such that it is movable through the guide space 150 of the door guide member 120. The sliding door 110 serves to partially open the gas injection hole 220 at initial stage and maintain the opening amount thereof such that a relatively small amount of inflation gas is discharged through the gas injection hole 220. After the initial stage set forth above, when the connection member 130 pulls the sliding door 110 with a predetermined force or more, the sliding door 110 is retracted into the guide space 150 of the door guide member 120 to further open and maintain the opening of the gas injection hole 220 such that a larger amount of inflation gas comparing to the amount of the initial stage can be discharged.

In an exemplary embodiment of the present invention, to maintain the opening amount of the gas injection hole 220 appropriate to discharge a relatively small amount of inflation gas at the initial stage set forth above, a portion of the sliding door 110 is fastened to the airbag housing 200 by at least a connection pin 140. The connection pin 140 is constructed such that it is broken when a predetermined force or more is applied thereto. In this embodiment, the connection pin 140 is made of nylon 66 and manufactured through an injection molding process such that it is integrally connected between the sliding door 110 and the airbag housing 200. In an exemplary embodiment of the present invention, the connection pin 140 is constructed to he broken when a load of an approximately 0.5 kgf is applied thereto.

The operation of pulling the sliding door 110 is conducted by the connection member 130. In this embodiment, the tether installed in the airbag cushion 300 is used as the connection member 130. The tether is fastened at a first end thereof to the inner surface of the airbag cushion 300 and a second end extends through the guide space 150 of the door guide member 120. The second end of the tether is fastened to the sliding door 110 through a coupling hole 111.

The door guide member 120 serves to support the sliding movement of the sliding door 110. The door guide member 120 is mounted to the airbag housing 200 using a separate retainer 230 at a position adjacent to the gas injection hole 220. The door guide member 120 has therein the guide space 150, through which the sliding door 110 slides as set forth above.

The operation of the present invention when a child sits on a passenger seat and when an adult sits on the passenger seat will be explained herein below.

Figure 4:
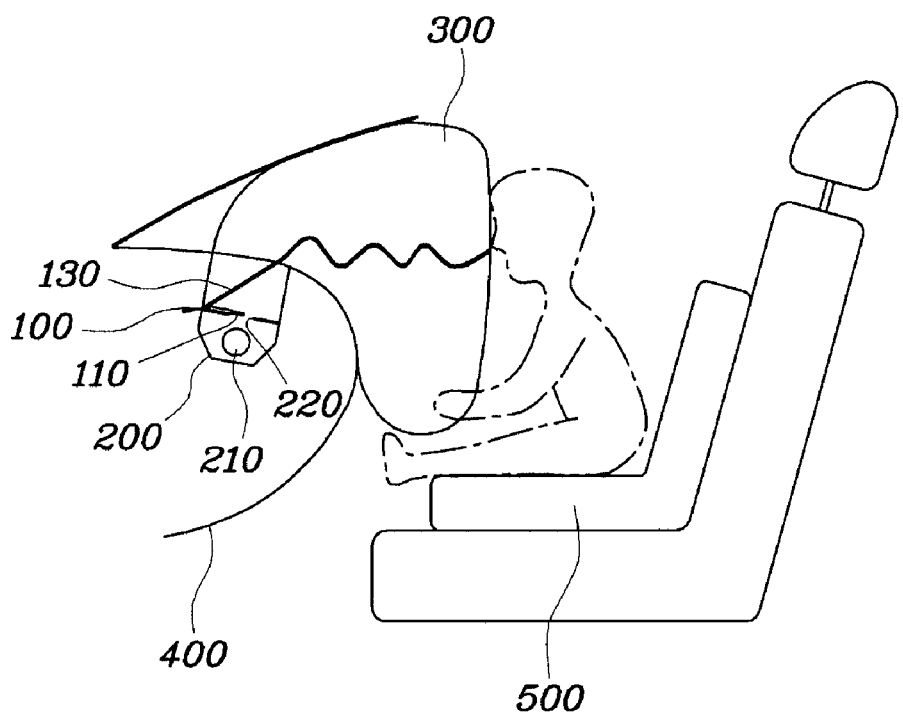
FIG. 4 is a view showing the operation of the airbag system for vehicles when a child sits on a passenger seat, according to the present invention.
Figure 5:
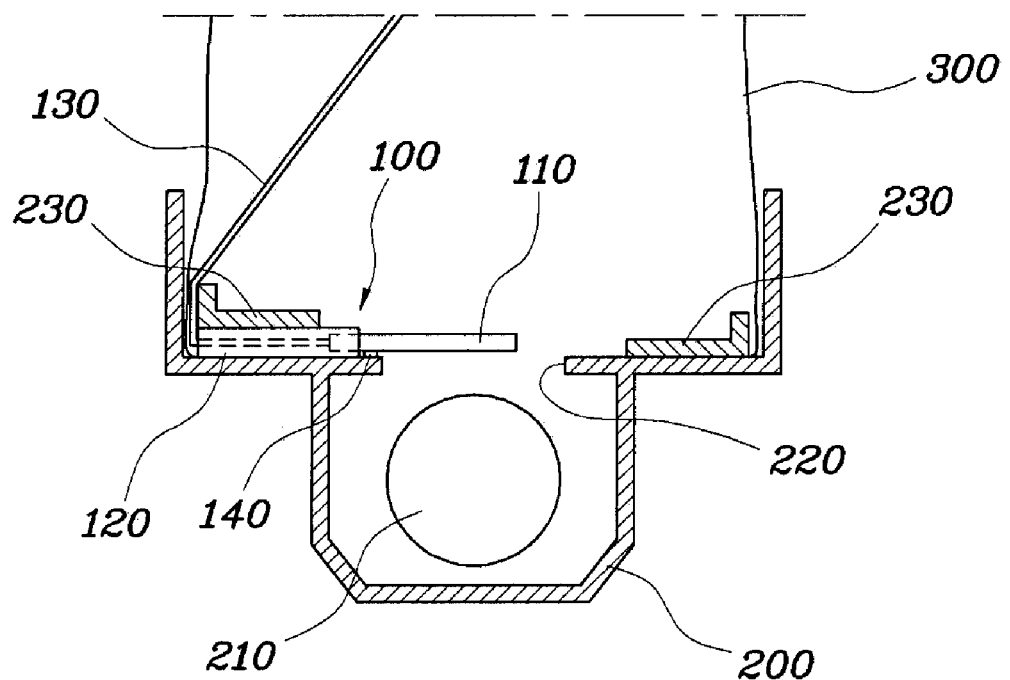
FIG. 5 is a view showing an enlargement of the airbag system in the operation state of FIG. 4.

First of all, as shown in FIGS. 4 and 5, the case where a child sits on the passenger seat will be explained.

When a child is seated by using such as a booster 500 on the passenger seat the child becomes disposed adjacent to the crash pad 400. In this case, when the airbag cushion 300 is inflated in the event of a vehicle collision, the sliding door 110, which is held by the connection pin 140, is maintained such that, at an initial stage of the collision, a smaller amount of inflation gas compared to the case of an adult is discharged through the gas injection hole 220 since the connection member 130 such as a tether does not sufficiently extend because of the child. Thereby, the child, who is disposed adjacent to the crash pad 400, can be prevented from being injured by the rapid inflation of the airbag cushion 300.

Figure 6:
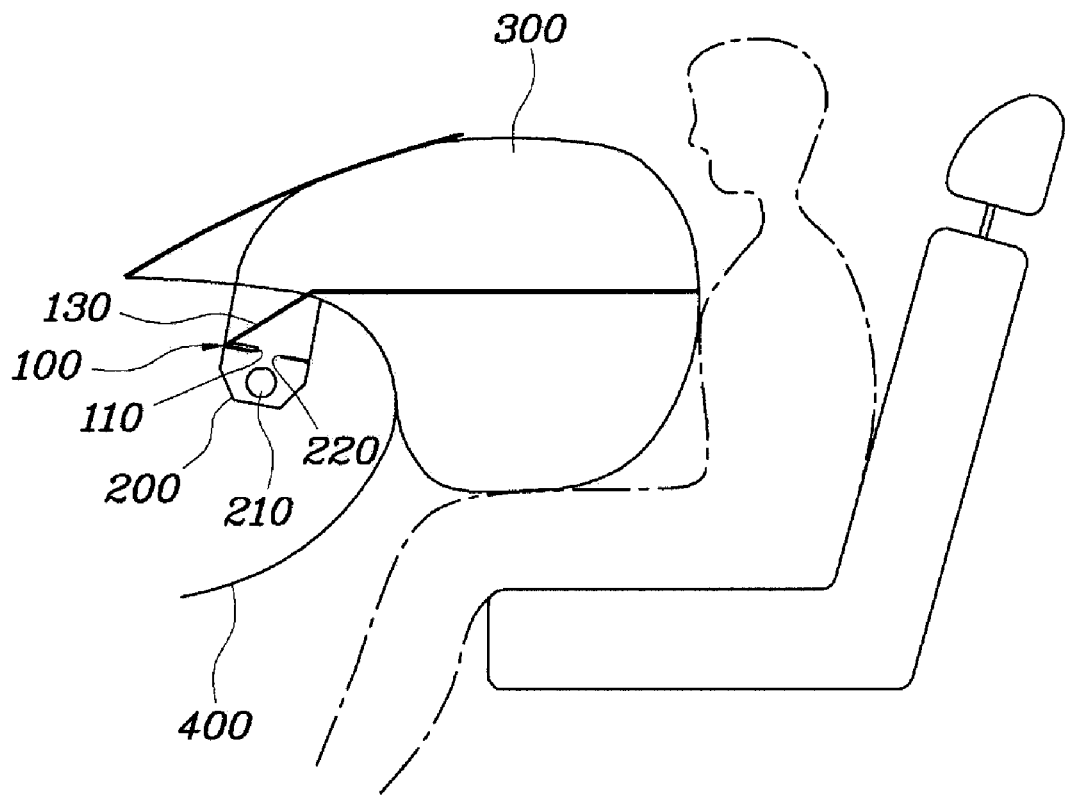
FIG. 6 is a view showing the operation of the airbag for vehicles when an adult sits on a passenger seat according to the present invention.
Figure 7:
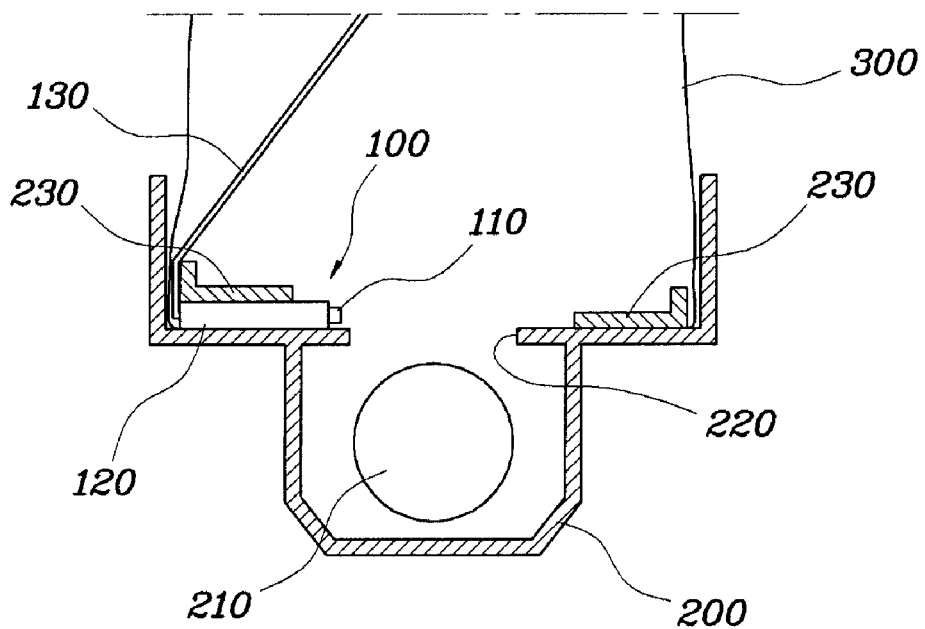
FIG. 7 is a view showing an enlargement of the airbag system in the operation state of FIG. 6.

FIGS. 6 and 7 illustrate the case where an adult sits on the passenger seat.

In this case, as the airbag cushion 300 is inflated in the event of a vehicle collision, the sliding door 110, which is held by the connection pin 140, is maintained such that a relatively small amount of inflation gas is discharged through the gas injection hole 220. After the initial stage is passed and thereby inflation gas of a predetermined amount is charged into the airbag cushion 300, the tether, i.e., the connection member 130, extends and becomes sufficiently tightened since the adult is disposed far from the crash pad 400, and thus pulls the sliding door 110.

As such, when the sliding door 110 is pulled, the connection pin 40 is broken, so that the gas injection hole 220 widens. Thereby, a larger amount of inflation gas is injected into the airbag cushion 300 through the widened gas injection hole 220. Hence, the airbag cushion 300 is completely inflated, thus protecting the adult from impact due to the vehicle collision.

Figure 8:
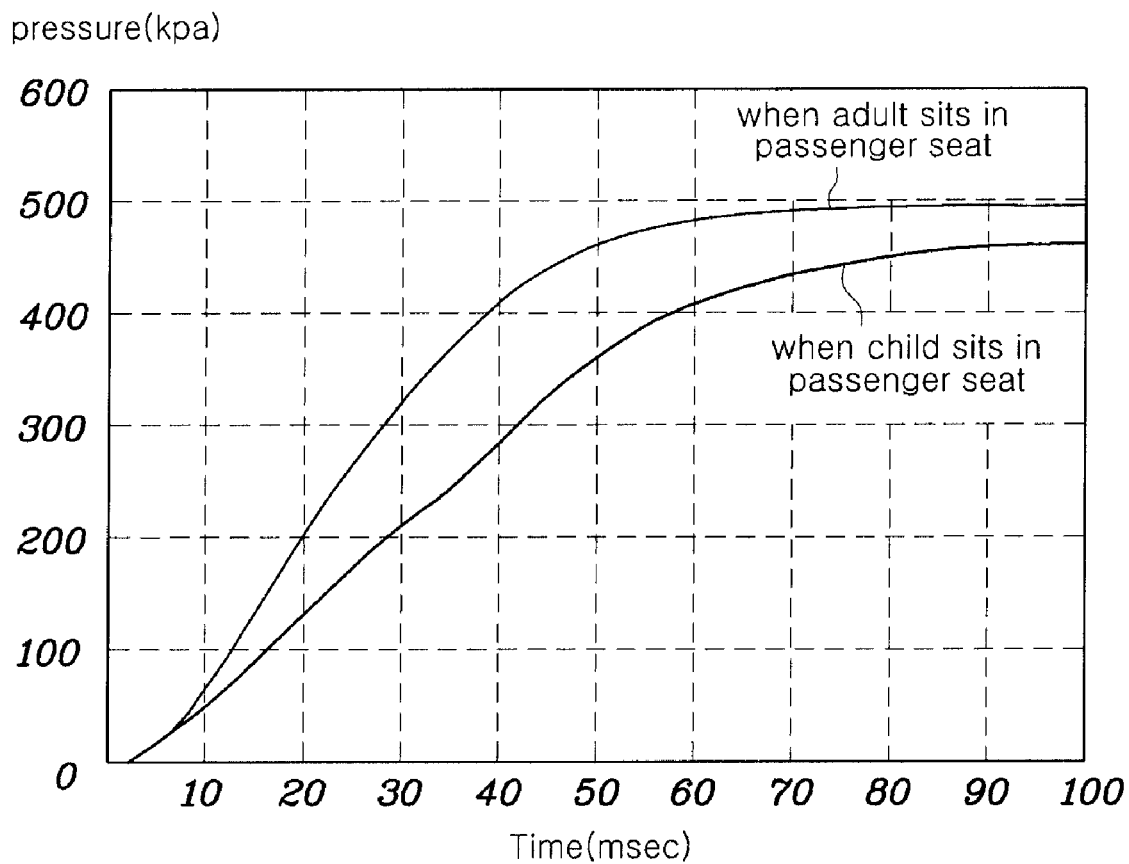
FIG. 8 is a graph showing variation in pressure in an airbag cushion of the airbag system according to the present invention.

As shown in FIG. 8, in the case where the child sits on the passenger seat when the airbag system is operated, a relatively small amount of inflation gas is injected into the airbag cushion 300, so that the pressure in the airbag cushion 300 is relatively low at the initial stage of operation of the airbag system. On the other hand, in the case where an adult sits on the passenger seat, when the airbag system is operated, a relatively large amount of inflation gas is injected into the airbag cushion 300, so that the pressure in the airbag cushion 300 is relatively high at the initial stage of operation of the airbag system.

As described above, the present invention provides an airbag system for vehicles which is constructed such that the inflation pressure applied to an airbag cushion when a child sits on a passenger seat differs from that when an adult sits on the passenger seat, thus preventing the child from being injured by the inflation pressure of the airbag cushion set for adults.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An airbag system for vehicles, comprising:
   a gas injection hole;
   an airbag housing having the gas injection hole and an inflator therein, so that inflation gas of the inflator is injected into an airbag cushion through the gas injection hole when a vehicle collision occurs, wherein the airbag cushion encloses the gas injection hole;
   a sliding door configured to move over the gas injection hole and to control an amount of the inflation gas injected into the airbag cushion, wherein an end portion of at least a connection pins are provided on the sliding door, the other end of the connection pin being fastened to the airbag housing; and
   a connection member coupling an inner portion of the airbag cushion and a portion of the sliding door and slidably moving the sliding door over the gas injection hole in response to inflation of the airbag cushion.

2. The airbag system for vehicles as set forth in claim 1, wherein the gas injection hole is formed in the airbag housing at a position corresponding to a direction in which the airbag cushion is inflated when the vehicle collision occurs.

3. The airbag system for vehicles as set forth in claim 1, wherein the sliding door further comprises a coupling hole thereon and an end portion of the connection member is coupled to the sliding door through the coupling hole.

4. The airbag system for vehicles as set forth in claim 1, wherein the connection member is disposed in the airbag cushion to maintain the airbag cushion in a predetermined shape when the airbag cushion is inflated.

5. The airbag system for vehicles as set forth in claim 4, wherein the connection member is a tether.

6. The airbag system for vehicles as set forth in claim 1, further comprising:
   a door guide member provided around the gas injection hole, the door guide member having a guide space and guiding the sliding door through the guide space in a direction in which the sliding door is moved to control an opening amount of the gas injection hole.

7. The airbag system for vehicles as set forth in claim 6, wherein the connection member couples the inner portion of the airbag cushion and the portion of the sliding door through the guide space of the door guide member.

8. The airbag system for vehicles as set forth in claim 7, wherein the door guide member is supported by a retainer.

9. The airbag system for vehicles as set forth in claim 1, wherein the at least a connection pins are provided on the sliding door in parallel along breadth direction of the sliding door.

10. The airbag system for vehicles as set forth in claim 9, wherein the connection pin is broken when a force of a predetermined load or more is applied thereto by the inflation of the airbag cushion.

11. The airbag system for vehicles as set forth in claim 9, wherein the connection pin is made of nylon 66.

12. The airbag system for vehicles as set forth in claim 9, wherein the connection pin is configured to be broken when a load of an approximately 0.5 kgf is applied thereto.

13. The airbag system for vehicles as set forth in claim 1, wherein the at least a connection pins are provided on the sliding door in series along longitudinal direction of the sliding door.

14. The airbag system for vehicles as set forth in claim 13, wherein the connection pin is broken when a force of a predetermined load or more is applied thereto by the inflation of the airbag cushion.

15. The airbag system for vehicles as set forth in claim 13, wherein the connection pin is made of nylon 66.

16. The airbag system for vehicles as set forth in claim 13, wherein the connection pin is configured to be broken when a load of an approximately 0.5 kgf is applied thereto.

17. The airbag system for vehicles as set forth in claim 1, wherein the sliding door is opened with a predetermined amount at initial state.

* * * * *